May 31, 1960 W. G. HODSON ET AL 2,939,020
CONTROL PULSE GENERATING MEANS FOR RADIO CONTROL SYSTEMS
Original Filed Oct. 11, 1950 3 Sheets-Sheet 2

INVENTORS:
Waldo G. Hodson
Walter E. Peterson
Howard H. Kenkel
Jacob J. Hagopian
Stuart R. Hennies BY Herbert E. Metcalf
THEIR PATENT ATTORNEY

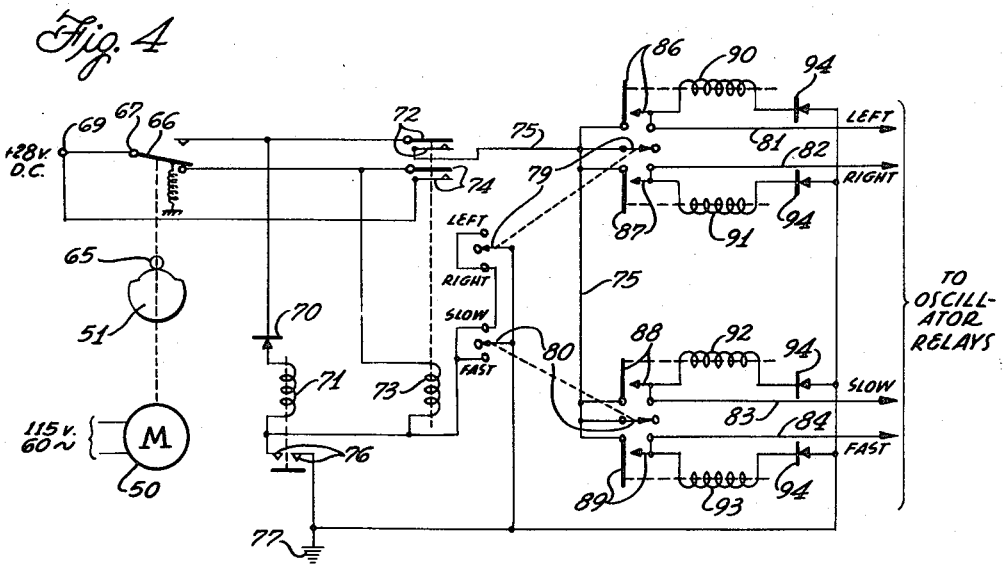

United States Patent Office 2,939,020
Patented May 31, 1960

2,939,020

CONTROL PULSE GENERATING MEANS FOR RADIO CONTROL SYSTEMS

Waldo G. Hodson, Burbank, Walter E. Peterson, Los Angeles, Howard H. Kenkel, La Canada, Jacob J. Hagopian, Los Angeles, and Stuart R. Hennies, Inglewood, Calif., assignors to Northrop Corporation, a corporation of California Original application Oct. 11, 1950, Ser. No. 189,514, now Patent No. 2,816,720, dated Dec. 17, 1957. Divided and this application Feb. 28, 1955, Ser. No. 494,444

8 Claims. (Cl. 307—132)

This application is a division of our copending application Serial No. 189,514, filed October 11, 1950, for Incremental Remote Radio Control System.

This invention relates to remote control systems, and more particularly, to an improved remote radio control system especially adapted for aircraft, wherein the control signals are in increments, or pulses, rather than being continuously proportional.

In position or attitude control systems, the rate and extent of movement of the controlled member must be proportional to the displacement of the controlling member throughout the operating range. However, when accuracy of response is desired at all times, even for minute control variations, in anything except a positively connected system, a continuously proportional control method has certain well recognized disadvantages. This is true in the case of a remote radio control system for an aircraft, for example, where the accuracy of the control link is dependent on such factors as signal frequency changes, variations in power supply, variable electrical characteristics of components, and possible spurious signals resulting from noise disturbances. The disadvantage of "zero-drift" causes the controlled object to be undesirably out of position from the setting of the control members. For instance, if control movements and settings are designed to be in accordance with the frequency of an incoming wave, drifting of the frequency from any pre-set value will produce the same effects as if the input setting were purposely changed. Again, if the controlled device or function depends on the instantaneous amplitude of a continuously applied signal, unavoidable variations in amplitude proportionately cause unwanted changes in the response of the device. In the case of a remote radio control system, a separate feedback loop would be required to maintain exact synchronization between the initial controlling member and the controlled device. Without this extra feedback loop the operator does not know how far he has moved the controlled device, nor whether the device is actually responding correctly to the control input signals.

It is an object of the present invention to provide a remote control system for an aircraft wherein zero-drift is eliminated, thereby rendering the attitudes of the aircraft exactly in correspondence with the settings or indications of the controller and allowing no attitude changes which have not been specifically introduced by the controller.

In addition, it is a further object to provide a control system, which attains the above object, and which possesses smooth operating characteristics effectively giving the required proportionality of control at all positions between the operating limits.

Another object is to provide a manually-controlled pulse-operated control system in which means are provided to insure a whole number of electrical pulses being formed, whenever a control signal is effected, so that proper response of the pulse-actuated system is assured.

Briefly, our invention comprises means for producing on-off control pulses, a remote transmitter for relaying these pulses to a receiver mounted in an aircraft whose attitude is to be controlled, and means for automatically transferring the pulses into incremental control movements of an attitude controlling member in the aircraft. The control increments are made small enough so that the system provides a continuously variable control in effect. The necessary plurality of control functions are established by means of separate audio frequency modulation channels, together with tuned filters at the receiving end for decoding and applying the control pulse signals to the proper controlling equipment.

A novel combination of relays, switches, and holding contacts is provided as a means for eliminating fractional pulses from being transmitted, this feature to be described in detail hereinafter.

The invention may be more fully understood by reference to the accompanying drawings, wherein:

Figure 4 is a schematic wiring diagram showing a preferred means for producing control tone pulses of constant time duration regardless of the instants that manually operated switches are actuated in the system of Figure 1.

Figure 1:
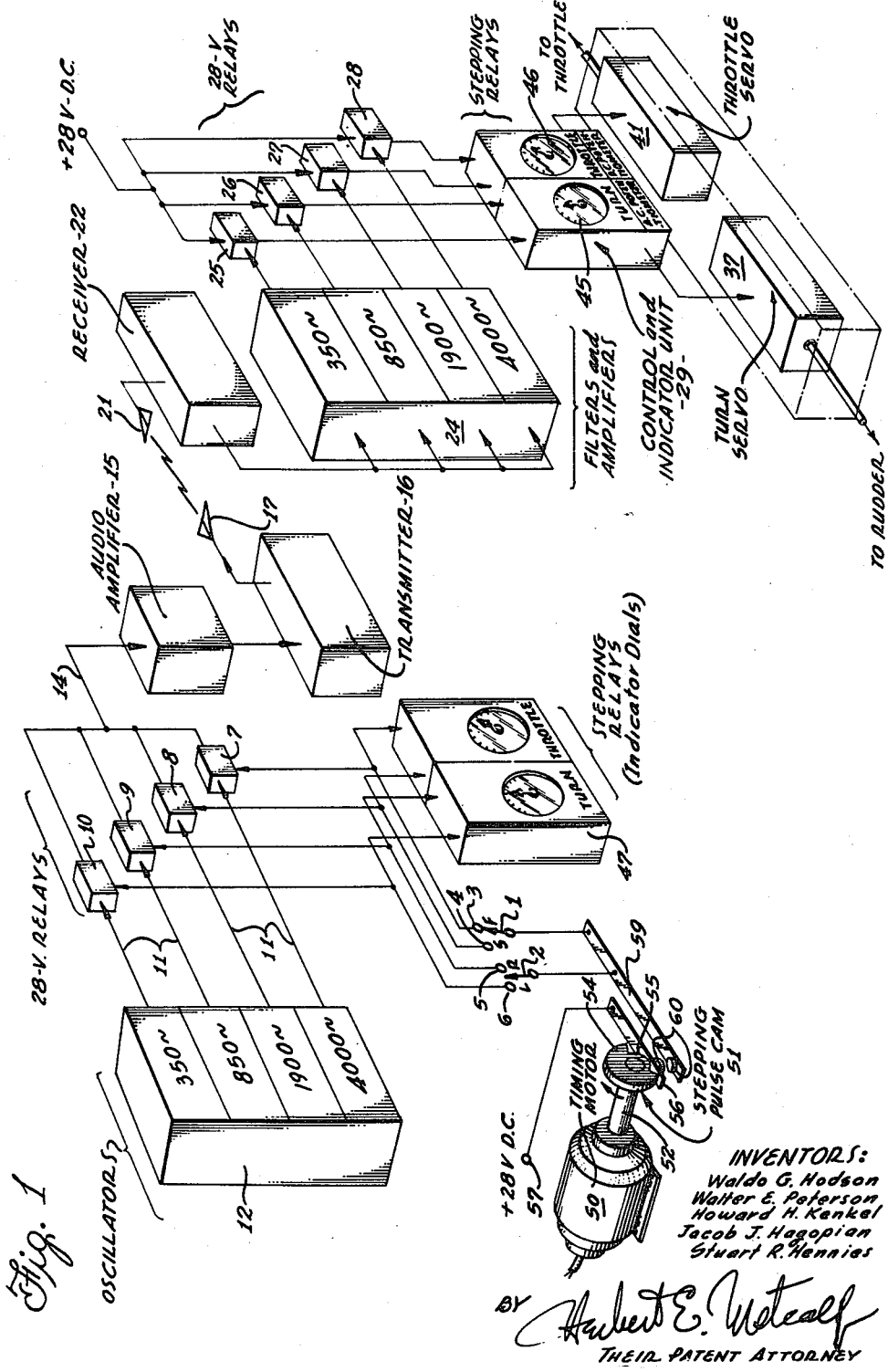
Figure 1 is a diagram which shows, in block form, the particular combination of components in which this invention resides, from the remote transmitter control station to the actuating motors in the controlled craft.

In Figure 1, a pair of single pole, double throw control switches 1 and 2 with center "off" positions are connected to actuate the throttle and turn control devices, respectively, in a remotely controlled aircraft, as will be shown herein. The left and right contact positions of the throttle control switch 1 are "slow" and "fast" respectively, while corresponding positions of the turn control switch 2 are "left turn" and "right turn" respectively, as marked on the drawing by single letters. Any number of additional control switches can be similarly used, of course, such as one for bank angle, one for pitch angle, or the like, the present two being shown for example only.

The poles of the control switches 1 and 2 are both adapted to be connected to a source of D.C. voltage, as will be described later. Each control switch contact 3, 4, 5 and 6 is electrically connected to the actuating coil of individual oscillator relays 7, 8, 9 and 10 respectively. One of the operating contacts of each oscillator relay is electrically connected by one of separate input wires 11 to the output of one of four audio oscillators 12. In this particular embodiment, the four oscillators are continuously operating at respective frequencies of 350, 850, 1900 and 4000 cycles per second, as indicated. When the oscillator relays 7–10 are non-actuated, the input wires 11 are dead-ended in the relays.

The other operating contact of each relay 7–10 is electrically connected to a common amplifier line 14 entering an audio amplifier 15 prior to feeding the audio tone, if present, into a transmitter 16 for modulation of the usual carrier wave. When actuated, each oscillator relay 7–10 closes its operating contacts to connect its respective input wire 11 to the amplifier line 14.

Thus it is seen that when, for example, the throttle control switch 1 is thrown to its right-hand contact 3, assuming operating voltage on the pole, the 4000-cycle oscillator relay 7 will be actuated to complete a 4000- cycle tone circuit to the amplifier 15 and transmitter 16 for radiation from the transmitter antenna 17. When the control switch returns to its center "off" position, the transmission of the 4000-cycle signal will cease, due to opening of the oscillator relay 7.

Figure 2:
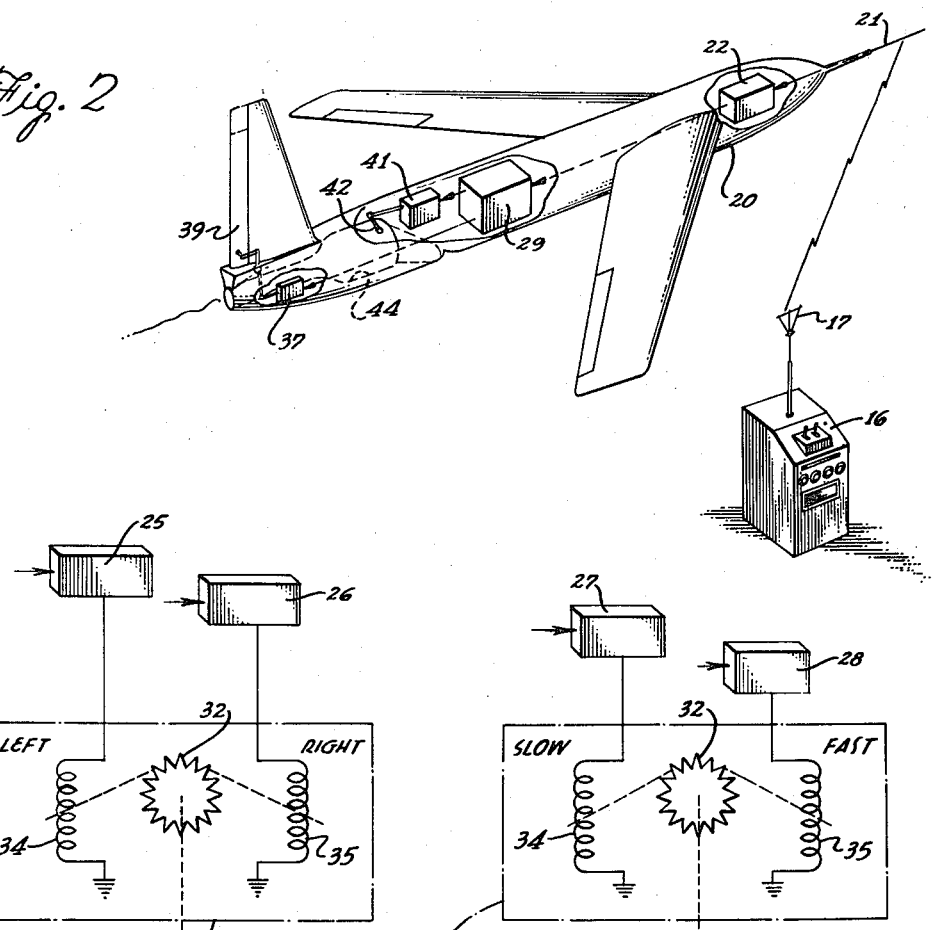
Figure 2 is a perspective view of an aircraft with throttle and rudder under control from a remote ground station, diagrammatically showing the transmitting and airborne equipment.

The transmitting equipment, as described, may be located at a ground station, as shown in Figure 2, or be mounted in a "chase" car or airplane, or duplicated in several locations for alternate control. In an airplane 20, or other device to be remotely controlled, the transmitted signal is picked up by a receiver antenna 21, and the equipment to be used following the antenna is also installed in the airplane 20.

After being demodulated and amplified in a conventional receiver 22, the signals are fed to the input of selective filters 24, as best shown in Figure 1, which pass or reject any particular audio tone according to its frequency. The filters 24 are individually tuned to the same frequencies as the oscillators 12 so that a 4000-cycle signal, for example, will be passed by the 4000-cycle filter only, as is well known.

The output of each filter is further amplified and then led to the actuating coil of one of four control relays 25–28. One operating contact of each control relay is supplied with a positive D.C. voltage and the other operating contact is electrically connected to operate a pilot's control and indicator unit 29 when the operating contacts are closed.

Figure 3:
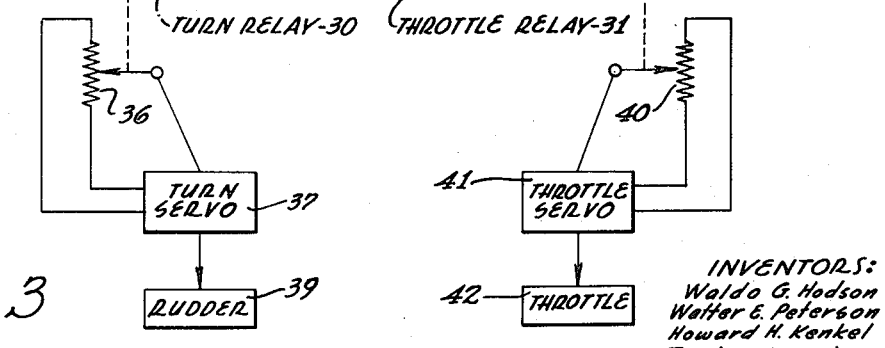
Figure 3 is a partial wiring diagram showing in greater detail the circuits which give incremental movements to the actuating motors in the controlled craft.

In the control and indicator unit, as further shown in Figure 3, appear two ratchet, or stepping relays 30 and 31, each having a ratchet wheel 32 and two oppositely connected actuating coils 34 and 35. These stepping relays are of the conventional type wherein energizatiton of the left-hand coil 34, in each, turns its ratchet wheel 32 one notch in one direction, while energization of the right-hand coil 35, in each, turns its ratchet wheel 32 one notch in the opposite direction.

In the turn stepping relay 30, it is the ungrounded end of each coil which is respectively connected to the 350 and 850-cycle control relays 25 and 26, and the coils of the throttle stepping relay 31 are likewise connected to the 1900 and 4000-cycle control relays 27 and 28. It is, therefore, evident that when one of the control relays is actuated by means of a signal voltage through a filter, the stepping relay coil connected with that control relay will be energized to produce a one-step rotation of the associated ratchet wheel. When the signal voltage, comprising an on-off pulse, is terminated, the stepping relay mechanism resets itself for the next incoming pulse, leaving the ratchet wheel in the new position. It is obvious that both stepping relay coils connected to one ratchet wheel can never be simultaneously energized, since the transmitter control switch 1 or 2 for both these coils can be in only one position at a time.

Attached to rotate with the ratchet wheel of the turn relay 30 is the movable arm of a turn potentiometer 36, which supplies a control signal to a turn servo 37 connected to move a rudder 39 of the airplane 20 for turn control. Many types of servo mechanisms can be controlled in this manner. In the preferred embodiment of this invention, the turn servo 37 is a component of an electrical automatic pilot installation, with the turn potentiometer 36 and its movable arm merely taking the place of the turn knob on the normal pilot's controller unit.

Similarly, the movable arm of a throttle potentiometer 40 is connected to be mechanically rotated with the ratchet wheel in the throttle relay 31, to supply the input signal to a throttle servo 41 for moving a throttle 42 of the aircraft engine 44. Again, many different throttle controllers can be used.

As shown in Figure 1, a turn indicator dial 45 and a throttle indicator dial 46 are included in the control and indicator unit 29. These dials are merely connected to follow the ratchet wheels of the respective stepping relays for visual checking of the system and are not necessary for successful automatic control.

To provide constant indications of throttle setting and turn angle to the remote operator, a duplicate set of stepping relays and indicator dials is preferably provided in an indicator assembly 47 and wired directly to the control switches 1 and 2 in parallel with the oscillator relays 7–10.

In overall operation of the complete system, it can be seen that the steps made by the ratchet wheels and potentiometer arms give control changes in the form of definite increments of motion. They are definite because sufficient energy is provided to close the necessary relays when the control switches are operated. By relay action, the stepping potentiometers are moved the same amount each time a control switch is closed and opened. Since the pulses are actually on-off signals, continuous stable operation is not depended on for keeping the rudder or throttle servo control members in a certain steady position, and zero-drift is entirely eliminated from the radio control link.

By governing the travel of each potentiometer arm per step, small or large control increments are enabled. In one embodiment of the present invention, a throttle controller and a pitch controller each are provided with 79 steps within the normal operating range. As mentioned in the summary of invention, this accomplishes, in practice, the effect of a continuously variable control in making the response smooth and proportional to input displacement. The rate of response can also be proportional since the stepping relays will operate fast or slow in accordance with a high or low frequency of control pulse generation.

Referring again to Figure 1, we prefer to initiate the control pulses automatically, after closing one of the control switches, by the use of a timing motor 50. This motor running at a predetermined speed, which may be varied if desired, revolves a stepping pulse cam 51 driven by a motor shaft 52. The pulse cam 51 comprises a large radius sector 54 extending appreciably more than half way around the cam periphery, and a small radius sector 55 completing the cam periphery. Spring-loaded to follow the surfaces of the sector 54 or 55 is a movable switch blade 56 permanently connected to a power source 57. A stationary switch blade 59 positioned opposite the movable blade 56 is separated therefrom when the movable blade 56 is riding on the small radius sector 55, and the two blades make contact by means of contact points 60 thereon when the movable blade 56 is riding on the large radius sector 54. The stationary switch blade 59 is electrically connected to the poles of control switches 1 and 2.

Therefore, with the contact points 60 alternately making and braking, a series of pulses is continuously provided at both control switches 1 and 2. Closing either of the control switches to one of its operating contacts then feeds a stream of control pulses through the system until the switch is returned to its "off" position. Each of the transmitted pulses causes one increment of change of the controlled attitude, as described previously. The pulse-forming motor, cam, and associated contacts eliminate the necessity of manually closing and opening the control switches once for each small increment of control. However, the present remote radio control system is not limited to use in connection with these pulse forming means. If they are not used, the power source 57 is connected directly to the poles of both control switches 1 and 2. Any other switch actuating means may be used, as desired, such as for example, the control keyer shown, described and claimed in the copending application of Hagopian et al., Serial No. 152,042, filed March 27, 1950, now Patent No. 2,774,864, issued Dec. 18, 1956.

If either control switch 1 or 2 is closed during some instant when the contact points 60 are closed, or if either control switch is opened to the "off" position while the contact points 60 are still closed, the result obtained with the circuit of Figure 1 would be the transmission of a partial length pulse which might or might not produce a sufficient signal to actute the stepping relay in the aircraft 20. To insure that a whole pulse or a whole number of pulses will be produced each time a control switch is operated and released, the circuit of Figure 4 is preferably used ahead of the oscillator relays 7–10.

Referring to Figure 4, the timing motor 50 revolves the pulse cam 51 at a continuous constant speed. A cam follower 65 is connected to a keying switch 66 to alternately position this switch in upper and lower contact positions, in accordance with the larger or smaller radius surface, respectively, of the cam 51. Operation of the keying switch 66 thus establishes an automatic pulsing rate of the system.

The pole 67 of the keying switch 66 is connected to an electrical power source 69, such as a positive 28 volts D.C. supply line, for example. The "up" position of the keying switch is connected through a selenium rectifier 70 to one end of a first starting relay 71, and to one of the upper contacts 72 of a second starting relay 73. The "down" position connects to one of the lower contacts 74 of the second starting relay 73, and to one end of the second starting relay coil. The other lower contact of the second starting relay 73 connects to the power source 69, and the other upper contact connects to a feeder wire 75. The lower ends of both starting relays 71 and 73 are connected to each other and to a set of sustaining contacts 76 which are closed by actuation of the first starting relay 71 to connect the relay lower ends to the grounded side 77 of the power source 69.

Two double pole, double throw function switches 79 and 80, which take the place of the control switches 1 and 2, respectively, are both connected with one pole grounded at 77 and the other pole connected to the feeder wire 75. For the turn function switch 79, the "left turn" position connects the grounded pole to the junction of the lower ends of the starting relays 71 and 73, and connects the feeder wire 75 to a "left" output wire 81. The "left" output wire 81 leads to the 350-cycle oscillator relay 10, and carries the desired output pulses to be transmitted as described previously. In the "right turn" position, the grounded pole is again connected to the lower ends of the starting relays 71 and 73, while the feeder wire 75 is connected to a "right" output wire 82 leading to the 850-cycle oscillator relay 9. In a similar manner, the throttle function switch 80 connects its grounded pole to the same starting relays 71 and 73 in both the "slow" and "fast" positions, and the other pole of the throttle function switch connects the feeder wire 75 to a "slow" output wire 83 and a "fast" output wire 84 when in the "slow" and "fast" positions, respectively.

Also, connected between the feeder wire 75 and each respective output wire 81–84 is a set of holding contacts 86–89, respectively, each such set belonging to a separate holding relay 90–93, respectively. Each set of holding contacts 86–89 is thus connected in parallel with the respective connections made by the function switches between the feeder wire 75 and the respective output wires 81–84. One end of the energizing coil of each holding relay 90–93 is connected to its corresponding output wire 81–84 and the other ends connect through separate relay rectifiers 94 to ground 77.

In operation, it can be seen that if the function switch 79 or 80 is moved to either of its operating positions, when the keying switch 66 is in the "up" position, nothing happens so far as the output wires 81–84 are concerned, and, therefore, no signal tone is transmitted because of the open circuit introduced by the upper contacts 72 of the second starting relay 73. If the function switch is kept engaged, the second starting relay 73 is energized when the keying switch 66 moves to the "down" position as a result of cam rotation, a completed circuit being formed from the power source 69 to ground 77 through the "down" position of the keying switch 66, the second starting relay 73, and the grounded pole of the function switch 79 or 80. Due to the lower contacts 74 of the second starting relay 73 being closed when this relay is energized, the relay remains energized when the keying switch 66 returns to the "up" position, and as a result 28 volts D.C. is fed through the upper contacts 72 of the second starting relay 73, the feeder wire 75, and the ungrounded pole of the function switch 79 or 80, to one of the output wires 81–84 for operating the indicator assembly 47 and the oscillator relay corresponding to the selected switch position.

Thus, the system is keyed automatically by the keying switch 66 as long as the function switch is kept engaged, and no fractional pulse is transmitted. The function switches 79 and 80 may be operated individually or simultaneously.

If, however, the function switch 79 or 80 is released to the off position shortly after a control pulse has been initiated, the sustaining contacts 76 of the first starting relay 71, which are closed during the period when the keying switch 66 is in the "up" position, will hold the second starting relay 73 energized until the keying switch 66 leaves the "up" position. Also, at the same time, current already flowing through the affected holding relay 90–93 maintains the connection between the feeder wire 75 and the corresponding output wire 81–84 by means of one of the sets of holding contacts 86–89 as long as the feeder wire 75 is supplied with the positive D.C. voltage. Therefore, the particular control signal circuit which was originally actuated is automatically maintained closed until the pulse signal duration reaches the value governed by the rate of switching of the keying switch 66, regardless of when the function switch 79 or 80 is manually returned to its off position.

Thus it is insured that all transmitted control pulses have the same constant duration determined solely by the contour and speed of the pulse cam 51, and, therefore, each pulse is long enough to insure correct operation of all stepping relays. The selenium rectifier 70 and the relay rectifiers 94 are provided to isolate the various relays from each other and thus prevent any unwanted operation of the relays on reverse polarity current.

It is apparent that the automatic pulsing means herein described and shown in Figure 4 is not restricted to use with a remote radio control system, but is of general application wherever it is desired to switch in and out a pulse or train of pulses at exactly the same portion of the pulse cycle every time, thus preventing a fractional pulse output. Other waveforms besides square can be similarly handled. Other applications of this circuit means are in recording exact numbers of pulses, and in pulsed radar systems, for example.

It is also seen that in the present invention, no zero-drift can possibly occur in the remote radio link, and that the reference member of the controlled device is, therefore, in a known position or attitude at all times. The controlled attitude is changed in definite incremental movements which are easily made small enough so that the effect is as smoothly proportional as that of a continuously variable system, both in extent and rate of control response. By having many small incremental steps, remote control equipment can be constructed which enables a remote operator to control the craft in a manner which simulates the smooth and normal feeling of direct control which a pilot on board the craft would have. For example, a pitch control member can be arranged to be rotated in a vertical plane imagined as containing the longitudinal axis of the craft, a bank control member can be arranged to move in a transverse vertical plane, and a throttle control member can be movable in a fore-and-aft direction, thus giving a simulated sense of conventional piloting procedures and making remote control simpler and easier for this reason.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is, therefore, claimed in any of its forms or modifications within the legitimate and valid scope of the appended claims.

What is claimed is:

1. Electrical pulse generating means for a pulse-operated control system comprising a motor-driven cam, a two-position electrical pulsing switch having its pole connected to the high side of an electrical power source, cam follower means connected between said pulsing switch and said cam, said cam being shaped to cause switching of said pulsing switch from one position to the other at a predetermined constant rate to alternately supply said electrical power to each of said positions, a double pole selector switch having at least two positions, means connecting a first pole of said selector switch to the grounded side of said power source, a first and a second control relay coil connected together at one end thereof, the other end of said first control coil connected to a first position of said pulsing switch, and the other end of said second control coil connected to a second position of said pulsing switch, means connecting the joined ends of said control coils to a first throw position of said selector switch first pole, a first pair of control relay contacts adapted to be closed when said first control relay coil is energized, means connecting one of said first pair to the joined ends of said control coils and means connecting the other of said first pair to said grounded power-source side, a second and third pair of control relay contacts, each pair adapted to be closed when said second control relay coil is energized, means connecting one of said second pair to said pulsing switch first position and means connecting the other of said second pair to a second pole of said selector switch, means connecting one of said third pair to said pulsing switch second position and means connecting the other of said third pair to said high power-source side, a pulse output line connected to a first throw position of said selector switch second pole, a holding relay coil with one end thereof connected to said ground, and the other end thereof connected to said first throw position of said selector switch second pole, a pair of holding relay contacts adapted to be closed when said holding coil is energized, one of said holding pair being connected to said selector switch second pole and the other of said holding pair connected to said first throw position of said selector switch second pole, whereby only pulses of a width determined by the amount of time said pulsing switch remains in said pulsing switch first position, as provided by said motor-driven cam, can appear in said pulse output line, irrespective of the instant that said selector switch may be moved to or removed from said first throw position.

2. Pulse generating means comprising a normally continuously running motor-driven cam, an electrical switch having a pole and two operating contact positions thereof, means for connecting its pole to a source of electrical power, cam follower means connected between said two-position switch and said cam, said cam being shaped to cause switching of said two-position switch from one position to the other at a predetermined constant rate to alternately supply electrical power from said source to the first and second of said positions, an output line, selector means operable to connect said output line to said first position of said two-position switch for constant pulsing of said output line, cut-off switching means connected between said first position of said two-position switch and said selector means, cut-off switching control means wired to the second position of said two-position switch to close said cut-off switching means when said two-position switch reaches said second position only if said selector means is set in an output pulsing position, circuit locking means connected to said cut-off switching means to thereafter hold said cut-off switching means closed while said two-position switch continues to operate and while said selector means remains in said pulsing position, thereby preventing a fractional pulse being sent to said output line should said selector means be initially set in pulsing position while said two-position switch is in said first position, and holding circut means wired in shunt with said selector means and in shunt with said cut-off switching control means, said holding circuit means connected to be broken when said two-position switch leaves said first position, to prevent a fractional pulse on said output line should said selector means be withdrawn from pulsing position while said two-position switch is in said first position.

3. Pulse generating means comprising an electrical switch having a pole and two contact positions thereof, means for connecting its pole to a source of electrical power, means for continuously switching said two-position switch from one position to another at a constant rate to alternately supply electrical power to the first and second of said positions, an output line, selector means operable to connect said output line to said first position of said two-position switch for constant pulsing of said output line, cut-off switching means connected between said first position of said two-position switch and said selector means, cut-off switching control means wired to the second position of said two-position switch to close said cut-off switching means when said two-position switch reaches said second position only if said selector means is set in an output pulsing position, circuit locking means connected to said cut-off switching means to thereafter hold said cut-off switching means closed while said two-position switch continues to operate and while said selector means remains in said pulsing position, thereby preventing a fractional pulse being sent to said output line should said selector means by initially set in pulsing position while said two-position switch is in said first position, and holding circuit means wired in shunt with said selector means and in shunt with said cut-off switching control means, said holding circuit means connected to be broken when said two-position switch leaves said first position, to prevent a fractional pulse on said output line should said selector means be withdrawn from pulsing position while said two-position switch is in said first position.

4. Pulse switching means comprising a two-position electrical keying switch having means for connecting its pole to a first side of a source of electrical power, means for switching said keying switch from one position to another at a predetermined constant rate to alternately connect said electrical power-source first side to each of said positions, a double pole function selector switch having at least two positions, means for connecting a first pole of said function switch to the opposite side of said power source, a first and a second control starting relay coil connected together at one end thereof, means connecting the other end of said first control coil to a first position of said keying switch, and means connecting the other end of said second control coil to a second position of said keying switch, the joined ends of said control coils connected to a first throw position of said function switch first pole, a first pair of control relay contacts adapted to be closed when said first control relay coil is energized, one of said first pair connected to said joined ends of said control coils and means for connecting the other of said first pair to said opposite power-source side, a second and third pair of control relay contacts, each pair adapted to be closed when said second control relay coil is energized, one of said second pair connected to said keying switch first position and the other of said second pair connected to a second pole of said function switch, one of said third pair connected to said keying switch second position, and means for connecting the other of said third pair to said power-source first side, a pulse output line connected to a first throw position of said function switch second pole, a holding relay coil with means for connecting one end thereof to said power-source opposite side, and the other end thereof connected to said first throw position of said function switch second pole, a pair of holding relay contacts adapted to be closed when said holding coil is energized, one of said holding pair being connected to said function switch second pole and the other of said holding pair connected to said first throw position of said function switch second pole, whereby only pulses of a width determined by the amount of time said keying switch remains in its first position, can appear on said pulse output line, irrespective of the instant that said function switch may be moved to or removed from said first throw position.

5. Apparatus in accordance with claim 4 wherein said means connecting said other end of said first control coil to said keying switch first position includes an isolating rectifier.

6. Pulse switching means for a control system having a number of selectable control circuits, comprising: a two-position keying switch with a pole terminal adapted to be connected to a first side of a constant source of electrical power, means for switching said keying switch from one position to another at a predetermined pulsing rate to alternately connect said power-source first side to each of said positions, a plurality of double pole function selector switches each having an "off" position and at least one operative position for each pole, means for connecting a first pole of all said function switches to the opposite side of said power source, a first and a second control starting relay coil connected together at one end thereof, means connecting the other end of said first control coil to a first position of said keying switch, and means connecting the other end of said second control coil to a second position of said keying switch, the joined ends of said control coils connected to all operative positions of said function switch first poles, a first pair of control relay contacts adapted to be closed when said first control relay coil is energized, one of said first pair connected to the joined ends of said control coils, and means for connecting the other of said first pair to said power-source opposite side, a second and a third pair of control relay contacts, each pair adapted to be closed when said second control relay coil is energized, one of said second pair connected to said keying switch first position, and the other of said second pair connected to all of said function switch second poles, one of said third pair connected to said keying switch second position, and means for connecting the other of said third pair to said power-source first side, said selectable control circuits connected respectively to said operative positions of said function switch second poles, a holding relay coil having means for connecting one end thereof to said power-source opposite side, the other end of said holding coil connected to one operative position of one of said function switch second poles, a pair of holding contacts adapted to be closed when said holding coil is energized, said holding pair connected between said function switch second poles and said one operative position, and additional holding relays and contacts similarly connected respectively between said function switch second poles and other individual function switch second pole operative positions.

7. Apparatus in accordance with claim 6 wherein said means for connecting said one end of said holding relay coil to said power-source opposite side includes an isolating rectifier, and including one other isolating rectifier similarly connected for each of said additional holding relays.

8. Pulse switching means comprising an electrical keying switch having a pole and two contact positions thereof, means for connecting its pole to a first side of a source of electrical power, means for switching said keying switch from one position to another at a predetermined constant rate to alternately connect said electrical power source first side to each of said positions, a double pole function selector switch having at least two throw positions, means for connecting a first pole of said function switch to the opposite side of said power source, a starting control relay having a coil and a first and second pair of associated contacts, each pair adapted to be closed when said coil is energized, one end of said relay coil connected to a second position of said keying switch, the other end of said relay coil connected to a first throw position of said function switch first pole, one of said first relay contact pair connected to said keying switch first position and the other of said first relay contact pair connected to a second pole of said function switch, one of said second relay contact pair connected said said keying switch second position, and means for connecting the other of said second relay contact pair to said power source first side, and a pulse output line connected to a first throw position of said function switch second pole, whereby when said function switch is moved to said first throw position at any time during the cycle of operation of said keying switch, a train of output pulses will be started in which the first pulse thereof is of full width and identical spacing as the following pulses.

References Cited in the file of this patent

UNITED STATES PATENTS 1,852,994   Frischknecht et al. _____ Apr. 5, 1932